3,306,873
PROCESS FOR THE PRODUCTION OF FILAMENTS OR FILMS BY SHAPING LINEAR POLYCARBONATES OF HIGH MOLECULAR WEIGHT
Béla von Falkai, Artur Prietzschk, Wolfgang Rellensmann, Alfred Reichle, and Horst Wieden, all of Dormagen, Germany, assignors to Farbenfabriken Bayer Aktiengesellschaft, Leverkusen, Germany, a German corporation
No Drawing. Filed Mar. 31, 1964, Ser. No. 356,076
Claims priority, application Germany, Apr. 11, 1963, F 39,470
6 Claims. (Cl. 260—47)

It is known to be possible to produce structures which can be better crystallized, by adding non-solvents or poor solvents to solutions of high polymers which do not crystallize satisfactorily.

For example, it is possible, by adding carbon tetrachloride, benzene, methylpropyl ketone or di-n-butyl ether, to polycarbonate solutions to prepare foils of good crystallinity, and these foils, after stretching, have better technological properties than the non-crystalline material, whereas filaments spun from these solutions by the dry-spinning or wet-spinning processes only provide a small increase in the crystallinity under extreme spinning conditions. For example, at relatively low spinning temperatures, a crystallization is certainly produced, but this is so irregular that the still soft, unfinished filaments likewise become very irregular when being drawn. These filaments are consequently unsitable for a further processing.

In addition, whereas the added components in a quantity of on average 50 to 100%, based on the polycarbonate used, are sufficient for a good crystallization when producing foils, the aforementioned non-solvents only have a comparatively low efficacy when producing filaments, even when they are added in a high excess, i.e. far above 100% or almost up to the gelling limit.

This different behaviour of the solution during the processing in one case to form films and in another case to form filaments is based on the differential evaporation of the solvent, which proceeds very much more slowly when producing films than when forming filaments. A more complete crystallization of the polymer is therefore guaranteed, this being known to be dependent on time.

It has now been found that alkyl and/or aryl esters of phosphorus acid of the general formula

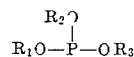

In which $R_1$ and $R_2$ represent alkyl, aryl or aralkyl and $R_3$ represents H, alkyl, aryl or aralkyl, as for example diethyl phosphite, dimethyl phosphite, trimethyl phosphite and diisopropyl phosphite, are excellently suitable as additives for promoting crystallization.

Accordingly, the subject of the present invention is a process for the production of filaments or films by shaping linear polycarbonates of high molecular weight from their solutions, and is characterized in that the polycarbonate solutions have added thereto, prior to the shaping, an ester of phosphorus acid according to the general formula indicated above in a quantity of 10 to 100% and advantageously 25 to 50%, based on the quantity of dissolved polycarbonate.

Films which are produced by casting from solutions with the said additives do not show a spherolithic structure in polarized light when examined under the light of a microscope, but merely double-refracting elements which cannot be recognized microscopically and which indicate a very fine microcrystalline morphology. In addition, the X-ray diagram and the density point to a well-crystallized structure of the unstretched foil.

Depending on the nature of the additive, good results are particularly found with additions of 20 to 40%, based on the quantity by weight of the polycarbonate, to a 13 to 25% solution, more especially 16.5 to 18.5%.

With the transferrence of these results to the production of fibers by the dry or wet spinning processes, the addition of larger quantities of 25 to 100%, based on the quantity by weight of polycarbonate, prove to be expedient, and the concentration of the polycarbonate solution should be between 14 and 23%, more especially 15.8 to 18.8%.

In order to guarantee the stability of the spinning solution, the additives preferably are admixed continuously, only immediately before the shaping of the solution.

Due to their increased crystallinity, the filaments produced by the process of the invention have improved resistance to solvents, improved temperature stability and a low sensitivity to temperature during the stretching, whereby in particular a better uniformity of the titre of stretched filaments is obtained.

EXAMPLE 1

A polycarbonate of the intrinsic viscosity $[\eta]=0.85$, prepared from di-(4-hydroxy phenyl)-2,2-propane and phosgene, is dissolved in methylene chloride to a 22% solution, forced through a filter press and supplied to a mixing member. A mixture of diethyl phosphite and methylene chloride is also injected into this mixing member, in such a ratio and in such a quantity that, on leaving the mixing member, there is produced a 17% polycarbonate solution with a diethyl phosphite content of 32%, based on polycarbonate.

The solution thus thoroughly mixed with the added component is immediately forced through a 25-aperture spinneret with an aperture diameter of 0.09 mm. into a heated shaft, which is blown with heated air at the spinneret. The filaments are drawn off by way of roller systems and wound. The filaments stretched above the ET of 1:4.9 have the following properties:

| | |
|---|---:|
| Titre _____den__ | 80 |
| Strength _____g./den__ | 2.7 |
| Elongation at break _____percent__ | 29 |
| Filament uniformity __percent mass fluctuation__ | 2.5 |
| X-ray interference width as standard for the crystallinity _____deg__ | 1.35 |
| Density _____ | 1.2180 |

EXAMPLE 2

The polycarbonate solution prepared according to Example 1 with an addition of diethyl phosphite is cast on a drum to form a film and dried for 5 minutes in an air stream at a temperature of 145° C. The film thus produced, after being stretched, has a strength of 29 kg./mm.² and an elongation at break of 25%. The X-ray interference width is 1.05 with a density of 1.2370.

We claim:
1. In the process of producing shaped articles by shaping a linear polycarbonate of di-(4-hydroxy phenyl)-2,2-propane from its solution, the improvement which comprises mixing with said polycarbonate solution, prior to the shaping thereof, a phosphorous acid ester of the formula

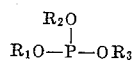

wherein $R_1$ and $R_2$ are selected from the group consisting of alkyl, aryl and aralkyl and $R_3$ is selected from the group consisting of hydrogen, alkyl, aryl and aralkyl, in an amount between 10 and 100% by weight based on the weight of said polycarbonate in solution, and then producing a shaped article from said mixed solution containing said phosphoric acid ester.

2. The process of claim 1 wherein said phosphoric acid ester is selected from the group consisting of diethyl phosphite, dimethyl phosphite, trimethyl phosphite and diisopropyl phosphite.

3. The process of claim 1 wherein said phosphoric acid ester is diethyl phosphite.

4. The process of claim 1 wherein said phosphoric acid ester is dimethyl phosphite.

5. The process of claim 1 wherein said phosphoric acid ester is trimethyl phosphite.

6. The process of claim 1 wherein said phosphoric acid ester is diisopropyl phosphite.

References Cited by the Examiner

UNITED STATES PATENTS 3,021,340  2/1962  Anderson _____ 260—77.5

FOREIGN PATENTS 828,523  2/1960  Great Britain.

OTHER REFERENCES

Bottenbruch et al., German application S.N. 1,128,653, printed April 1962.

SAMUEL H. BLECH, *Primary Examiner.*